T. H. WILSON.
EXERCISER.
APPLICATION FILED SEPT. 15, 1915.
1,168,361.
Patented Jan. 18, 1916.
2 SHEETS—SHEET 1.
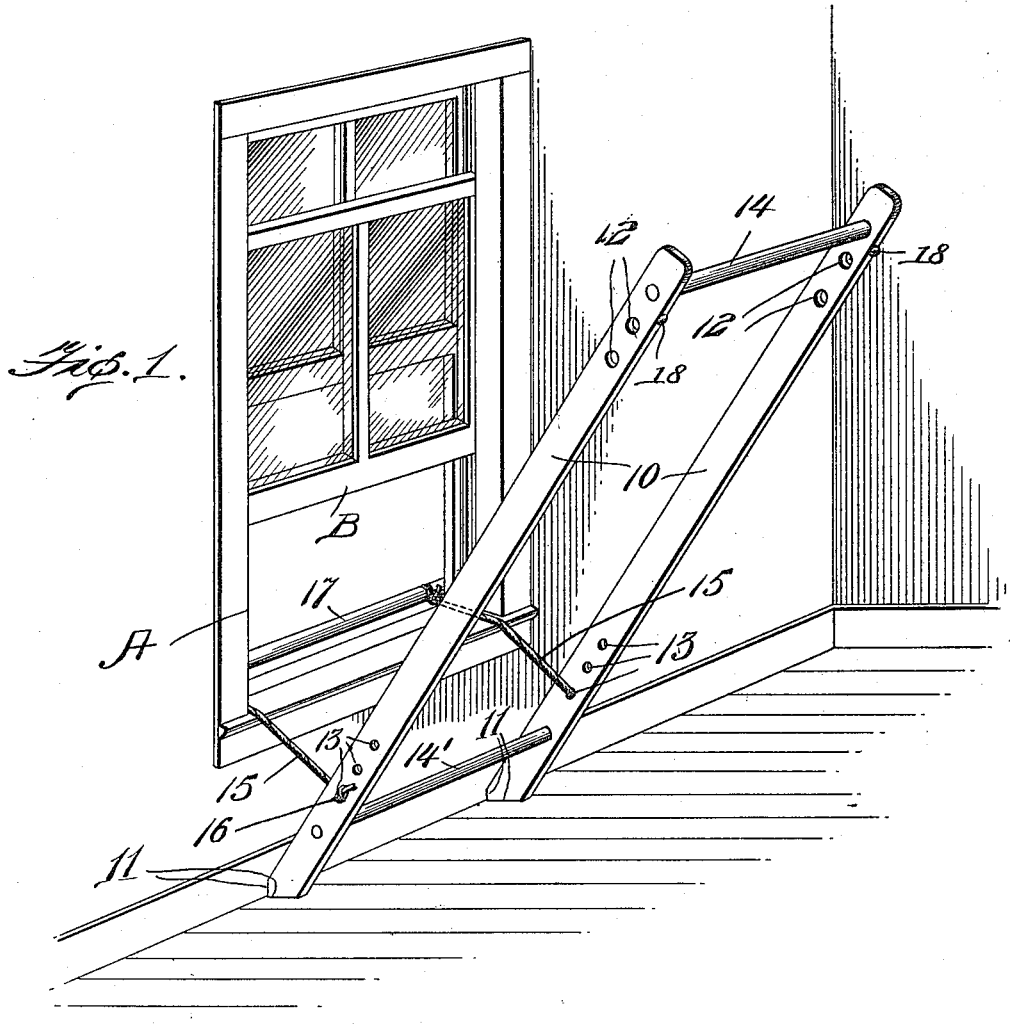
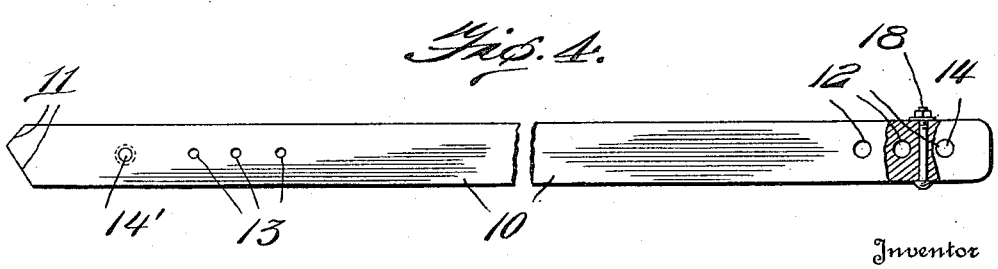
Inventor
Thomas H. Wilson
By Davis P. Moore
Attorney

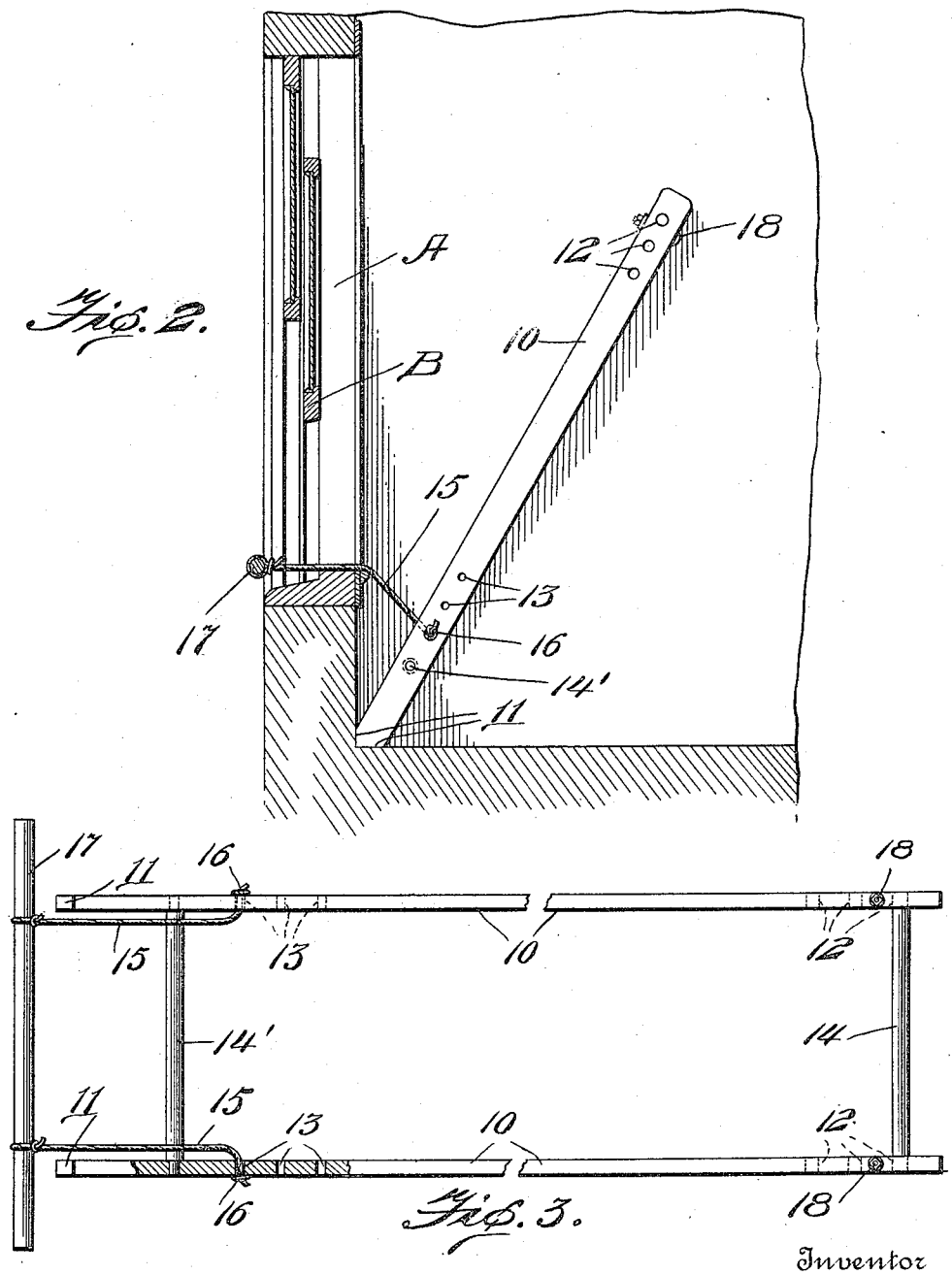

UNITED STATES PATENT OFFICE.

THOMAS HENRY WILSON, OF MEMPHIS, TENNESSEE.

EXERCISER.

1,168,361.      Specification of Letters Patent.      Patented Jan. 18, 1916.

Application filed September 15, 1915. Serial No. 50,797.

*To all whom it may concern:*

Be it known that I, THOMAS H. WILSON, a citizen of the United States, residing at Memphis, in the county of Shelby and State of Tennessee, have invented certain new and useful Improvements in Exercisers, of which the following is a specification.

The invention relates to an exercising device, and more particularly to the class of window hanger exercising apparatuses.

The primary object of the invention is the provision of an apparatus of this character, wherein the frame thereof can be securely and conveniently fastened to the frame of any ordinary window, so that it may be used to hang a swing, hammock, reclining chair, cot, small baby bed or shaker or the like, to permit the occupancy thereof, or it is adaptable for the suspension of a punching bag and for use as a horizontal bar in exercising.

Another object of the invention is the provision of an apparatus of this character, wherein the construction thereof is novel in form to permit the positioning and fastening of the same with despatch for use.

A further object of the invention is the provision of an apparatus of this character, which is simple in construction, thoroughly reliable and efficient in operation, strong, durable, light in weight, readily and easily fastened to a window, portable, and inexpensive in manufacture.

With these and other objects in view, the invention consists in the features of construction, combination and arrangement of parts as will be hereinafter fully described, illustrated in the accompanying drawings, and pointed out in the claims hereunto appended.

In the accompanying drawings: Figure 1, is a perspective view showing the apparatus constructed in accordance with the invention applied to a window. Fig. 2, is a vertical sectional view through the window showing the apparatus in position. Fig. 3, is a plan view of the apparatus detached. Fig. 4, is edge elevation.

Similar reference characters indicate corresponding parts throughout the several views in the drawings.

Referring to the drawings in detail, A, designates a window frame, which is of the ordinary well known construction, and B, the sliding sashes, with the lower one in raised position for the attachment of the apparatus which will be hereinafter fully described.

The exerciser comprises spaced parallel side bars 10, preferably made from hard wood, and are of the same length with respect to each other, having beveled corner edges 11, while formed in each side bar near opposite ends thereof are spaced holes 12 and 13, respectively, for a purpose presently described. In the holes 12, is adjustably and detachably received a cross rung 14, which serves as a horizontal bar for exercise work or for supporting a swing, hammock, cot, baby shaker or the like, or for suspending a punching bag. Permanently mounted in the side bars 10, spaced from the ends having the beveled corner edges 11, is a cross rung 14', which holds the said bars 10, together, while passed through the bars 10, at the opposite ends between certain of the holes 12, are bolt members 18, having the usual nuts threaded thereon, so as to strengthen the bars and prevent the splitting thereof. Removably passed through the holes 13, are hanger cords 15, having knotted ends 16, which prevent the hanger cords or cables from being pulled through the holes 13, while the opposite ends of these cords or cables 15, are tied or otherwise secured to a hanger bar 17, which is passed through the window frame so as to lie transversely thereof for engagement with the vertical stiles thereof at the outer sides of the same, the bar 17, being of greater width than the window frame to prevent it from being pulled therethrough when said bar and cords or cables hold the apparatus at an angle to the side wall having the window therein for use. It will be apparent that the apparatus can be readily adjusted to different angles, and also that the rung 14, may be raised or lowered to suit the fancy of the user of the apparatus.

From the foregoing it is thought that the construction and manner of use of the apparatus will be clearly understood, and therefore a more extended explanation has been omitted. However, various changes and modifications may be made, as the occasion will require, and as come properly within the scope of the appended claims, without departing from the spirit of the invention or sacrificing any of its advantages.

What is claimed is:

1. An exercising apparatus comprising a pair of spaced parallel side bars, a cross rung adjustably mounted therein near one end, flexible members detachably and adjustably engaged with the side bars near the other end, and a hanger bar connected to the flexible members.

2. An exercising apparatus comprising a pair of spaced parallel side bars having holes therein in spaced relation to each other near opposite ends, a cross rung adjustably engaged in certain of the holes, knotted cables adjustably engaged in certain other holes, and a hanger bar connected to the cables.

In testimony whereof I affix my signature.

THOMAS HENRY WILSON.

Copies of this patent may be obtained for five cents each, by addressing the "Commissioner of Patents, Washington, D. C."